(12) United States Patent
Ruppert

(10) Patent No.: US 12,542,510 B2
(45) Date of Patent: Feb. 3, 2026

(54) EXCITER CIRCUIT FOR AN EXTERNALLY EXCITED SYNCHRONOUS MACHINE, MOTOR VEHICLE AND METHOD FOR DE-EXCITATION OF AN EXCITER WINDING

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 230 days.

(21) Appl. No.: 18/455,519

(22) Filed: Aug. 24, 2023

(65) Prior Publication Data

US 2024/0072713 A1 Feb. 29, 2024

(30) Foreign Application Priority Data

Aug. 25, 2022 (DE) .......................... 102022121516.4

(51) Int. Cl.
*H02P 8/14* (2006.01)
*H02M 3/156* (2006.01)
(Continued)

(52) U.S. Cl.
CPC ............ *H02P 29/00* (2013.01); *H02M 3/156* (2013.01)

(58) Field of Classification Search
CPC ........ H02M 7/1623; H02M 7/17; H02M 7/19; H02M 7/2195; H02M 7/23; H02M 7/46;
(Continued)

(56) References Cited

U.S. PATENT DOCUMENTS 4,297,739 A * 10/1981 Goldin ................. H02H 7/0805
361/91.8
6,351,104 B1 * 2/2002 Koelle ...................... H02P 9/48
322/77
(Continued)

FOREIGN PATENT DOCUMENTS

DE 102014209607 A1 11/2015
DE 102017200220 A1 6/2017
(Continued)

*Primary Examiner* — Kawing Chan
*Assistant Examiner* — Charles S Laughlin
(74) *Attorney, Agent, or Firm* — Seed Intellectual Property Law Group LLP

(57) ABSTRACT

An exciter circuit for an externally excited synchronous machine, comprising two voltage supply terminals for a voltage supply, two exciter current terminals configured to be connected to an exciter winding of the externally excited synchronous machine, and a bridge circuit coupled to the voltage supply terminals, a controller, a protective arrangement at a side of the exciter circuit with the exciter current terminals, wherein the protective arrangement includes a semiconductor switch switched in series with the exciter winding and a freewheeling path running in parallel with the exciter winding and having a connection point between one of the exciter current terminals and the semiconductor switch, wherein the freewheeling path has a diode which, in operation, is blocking in an exciter current flow direction, and a conversion resistor, wherein the controller, in operation, opens the semiconductor switch when a de-excitation signal is present.

19 Claims, 4 Drawing Sheets

(51) Int. Cl.
*H02P 9/44* (2006.01)
*H02P 29/00* (2016.01)

(58) Field of Classification Search
CPC ...... H02M 7/48; H02M 7/4835; H02M 7/487;
H02M 7/49; H02M 7/493; H02M
7/53873; H02M 1/0006; H02M 1/0048;
H02M 1/0093; H02M 1/15; H02M
1/4208; H02M 1/4225; H02M 3/1586;
H02M 3/1588; H02M 3/24; H02M
3/3155; H02M 3/335
See application file for complete search history.

(56) References Cited

U.S. PATENT DOCUMENTS

| | | | | |
|---|---|---|---|---|
| 6,828,919 | B1* | 12/2004 | Gold | ............... H02P 9/302 |
| | | | | 318/718 |
| 10,862,374 | B2 | 12/2020 | Sudan et al. | |
| 11,095,211 | B2 | 8/2021 | Herrmann et al. | |
| 2001/0006471 | A1* | 7/2001 | Diallo | ............ H02M 3/33592 |
| | | | | 363/125 |
| 2010/0164428 | A1* | 7/2010 | Xu | .................. F01D 15/10 |
| | | | | 310/211 |
| 2021/0075277 | A1 | 3/2021 | Schiedermeier et al. | |
| 2021/0273590 | A1* | 9/2021 | Pathmanathan | ......... H02P 9/10 |

FOREIGN PATENT DOCUMENTS

| | | |
|---|---|---|
| DE | 102017204091 A1 | 9/2018 |
| DE | 102019124212 A1 | 3/2021 |
| DE | 102020120814 A1 | 2/2022 |

\* cited by examiner

EXCITER CIRCUIT FOR AN EXTERNALLY EXCITED SYNCHRONOUS MACHINE, MOTOR VEHICLE AND METHOD FOR DE-EXCITATION OF AN EXCITER WINDING

BACKGROUND

Technical Field

The disclosure relates to an exciter circuit for an externally excited synchronous machine, comprising two voltage supply terminals for the voltage supply, two exciter current terminals to be connected to an exciter winding, especially a rotor winding, of the externally excited synchronous machine, and a bridge circuit to be hooked up to the voltage supply terminals, especially one in the form of an asymmetrical full bridge. In addition, the disclosure relates to a motor vehicle and a method for de-excitation of an exciter winding of an externally excited synchronous machine.

Description of the Related Art

For hybrid and electric vehicles it is known how to use synchronous machines as traction machines. While traditional drive systems have often made use of permanently excited synchronous machines, it has also been proposed in the meantime to use externally excited synchronous machines in motor vehicles as traction machines. With externally excited synchronous machines (often also called current excited synchronous machines), the cost-intensive permanent magnets in the rotor are unnecessary. The required magnetic field in the rotor is provided by an exciter winding as the rotor winding, in which a direct current is supplied as an exciter current, for example across slip rings.

In order to provide this direct current, beyond the inverter (traction inverter) associated with the stator windings, an exciter circuit as an additional power electronic circuit element is needed as a further power electronics. For such an exciter circuit, a power of around 15 kW may be needed, for example. The exciter circuit usually comprises a bridge circuit as its principal component, especially an asymmetrical full bridge circuit, which provides the exciter current for energizing the exciter winding at corresponding exciter current terminals.

Both the inverter connected to the stator windings of the externally excited synchronous machine and the exciter circuit can be physically connected to at least one common intermediate circuit capacitor, which is usually arranged structurally on the inverter, and can be energized by this, while the at least one intermediate circuit capacitor can be connected in turn to the high-voltage battery of the motor vehicle, i.e., the traction battery. In the recuperation operating mode, i.e., in the generator operation of the externally excited synchronous machine, the at least one intermediate circuit capacitor as well as the high-voltage battery of the motor vehicle can be charged.

Depending on the operating state of the inverter, different operating states of the exciter circuit and thus of the exciter section formed from the exciter circuit and the exciter winding can be provided. Thus, a first operating state, which usually corresponds to a switching state of the bridge circuit, can be provided, which builds up an exciter current. Exciter current within the rotor can be dissipated through freewheeling states, in an asymmetrical full bridge circuit for example a highside freewheeling and a lowside freewheeling. An operating state is also conceivable in which the exciter current is fed back across the voltage supply terminals to the at least one intermediate circuit capacitor or to the high-voltage network of the motor vehicle.

The dissipation of the exciter current and the associated demagnetization of the rotor is usually accomplished through the freewheeling operating states. In these states, the inductance of the exciter winding has the effect that the exciter current at first continues to flow and is only slowly dissipated by ohmic resistances. However, a dissipation of the rotor current can also occur through feedback.

However, cases exist in a motor vehicle and other applications in which a rapid de-excitation of the rotor, and hence a kind of emergency de-excitation, is necessary. For example, if an accident or other relevant defect occurs when the rotor of the externally excited synchronous machine is fully magnetized and rotating fast, it is required to de-excite and therefore demagnetize the rotor as soon as possible, in order to both eliminate the energy and shut off the electric driving torque. In such an emergency, therefore, the exciter current must be interrupted at once, so that the immediate demagnetization of the rotor will occur and the safety requirements will be satisfied.

In the exciter circuits known thus far, the topology does not provide for such a rapid discharging, so that there is a need for improvement in this regard.

DE 10 2020 120 814 A1 relates to a method for verifying a rapid de-excitation path of an exciter circuit for an externally excited electric machine in which a first and a second switching element are hooked up in series between a positive and a negative voltage terminal and a fourth switching element is hooked up in parallel with the second switching element. An exciter winding of the externally excited electric machine is hooked up at the first end between the first and second switching element and connected at the second end to the second switching element. An electrical component is connected at one end to the second end of the exciter winding and at the other end to one of the power supply terminals, the exciter winding being charged when the third switching element is closed, and the third switching element is then opened and with the third switching element open a characteristic quantity for a current flow in a path comprising the exciter winding and the electrical component is detected. With the aid of this quantity, the function of the electrical component is verified. For a rapid de-excitation, the first and the third switching element can be opened, so that the exciter winding is de-excited against the positive power supply voltage or against the voltage occurring on account of the electrical component, which should be significantly faster in time.

A switch device for switching an electric exciter current for an electric machine with a rotor is described by DE 10 2017 204 091 A1. It is proposed here to employ an auxiliary voltage source in order to vary the voltage across the exciter winding by way of the auxiliary voltage source, in particular for the rapid de-excitation, and/or to increase it for the rapid de-excitation relative to the voltage of the actual voltage source.

DE 10 2017 200 220 A1 discloses an actuating method and a switch device for an externally excited synchronous machine as the drive unit in a hybrid or electric vehicle. In order to lessen the EMC problems or stray oscillations in general, it is proposed to provide a short circuit branch in parallel with a bridge branch of an asymmetrical full bridge, in which a rotor is situated, by which the rotor can be short circuited.

BRIEF SUMMARY

Embodiments of the disclosure provide an exciter circuit to provide enhanced safety and/or improved protection in emergency situations.

Embodiments of the disclosure provide an exciter circuit of the kind mentioned above, it is proposed according to the disclosure that the exciter circuit moreover comprises a controller and, at the side with the exciter current terminals, a protective arrangement, comprising a semiconductor switch switched in series with the exciter winding and a freewheeling path running in parallel with the exciter winding and having a connection point between an exciter current terminal and the semiconductor switch, this path having a diode which is blocking in the exciter current flow direction and a conversion resistance, and the controller are designed to open the semiconductor switch when a rapid de-excitation signal is present.

Thus, it is proposed to add additional components between the bridge circuit, which remains without modifications, and the exciter winding, in order to realize a safety function, namely, the protective arrangement, which can also be understood as being a protective circuit, and which serves in particular for the rapid de-excitation of the exciter winding and thus the demagnetization of the rotor. In other words, the circuit topology localized in the exciter circuit is expanded. For this, a semiconductor switch (often also called a power semiconductor) is added to one of the exciter current terminals, preferably in the return path of the exciter current. Between the semiconductor switch and the exciter current terminals, a freewheeling path is switched in parallel with the latter, therefore in the connected state of the exciter winding. The freewheeling path comprises a diode which is blocking in the exciter current flow direction, so that the electric power provided continues to be taken entirely through the exciter winding in the normal operation. Moreover, the freewheeling path comprises a conversion resistance, which on the one hand prevents the freewheeling path from being used already in the normal operation, but on the other hand is suited to converting very rapidly the energy of the exciter current maintained on account of the inductance of the exciter winding into heat and thus breaking down the exciter current when the semiconductor switch is opened and a closed circuit (oscillatory circuit) is formed from the freewheeling path and the connected exciter winding in the rotor.

The semiconductor switch, as is basically known, can be configured preferably as an Insulated-Gate Bipolar Transistor (IGBT) or a Metal-Oxide-Semiconductor Field-Effect Transistor (MOSFET), especially an N-channel MOSFET. Especially advisedly, the semiconductor switch can be switched in parallel with a protective diode, especially a Zener diode. Thus, in addition, at least one Zener diode can be integrated in the blocking direction, preferably in parallel with the semiconductor switch. The Zener diode serves for protection of the power semiconductor in the disconnecting process, since a reverse voltage is built up by the disconnecting of the inductance.

In normal operation, the additional semiconductor switch is switched to be conducting, i.e., it is closed, and the entire exciter current flows across the semiconductor switch, for example across slip rings on the externally excited synchronous machine, into the exciter winding of the rotor. The semiconductor switch is advisedly designed and configured such that its conductor losses are minimized. In particular, since nothing has been altered in the bridge circuit and the additional semiconductor switch is closed in the normal operation, all previous options for the operating states or operating modes are preserved. In particular, a slow de-excitation is possible, for example through a feedback of the rotor current, in which the available energy can be supplied to an intermediate circuit capacitor of the inverter, exactly like a freewheeling mode. In this operating mode, as already mentioned, the additional semiconductor switch remains closed and no exciter current of any kind flows along the freewheeling path or the Zener diode, if present.

It should further be noted in this place that the providing of the freewheeling path can also be understood as being a so-called snubber circuit, since a dampening of unwanted oscillations also occurs in this way, in particular disruptive high frequencies or voltage peaks are neutralized, such as may occur when switching inductive loads, here, the exciter winding. This provides a further benefit of the expansion of the exciter circuit. The providing of the freewheeling path can also be understood as being the creation of a clamping circuit. Clamping circuits are used, for example, to "clamp" an electrical voltage to a fixed maximum level. Then the voltage cannot exceed a particular threshold (such as 1000 V DC voltage).

Now, if a situation arises in which the fastest possible de-excitation, and thus demagnetization, of the rotor should occur, for example, if there is a defect or a vehicle accident, the exciter current must be dissipated in the shortest time in order to drain away the stored electrical energy and thereby bring about both electrical safety and also switch the electric drive train torque-free.

By opening the semiconductor switch, the current flow in the direction of the voltage supply terminals is interrupted. Since the exciter winding, or more precisely its inductance (the rotor inductance), strives to maintain the exciter current flow through the inductance, the exciter current now flows through the conversion resistance and the diode of the freewheeling path. The available electric energy is very quickly converted by the conversion resistance into power dissipation, which can be taken away by an appropriate cooling device. Thus, the rotor is demagnetized, so that the externally excited synchronous machine in particular is also torque-free.

Summarizing, the assurance of functional safety requirements in all operating states of the motor vehicle is achieved by the present disclosure. Thanks to the protective arrangement, the safety is enhanced, especially in regard to potentially occurring fires, and the possibility of rapid de-excitation in the event of a fault or an accident is assured. Because of the localization of the protective arrangement in the exciter, the expense for material costs can be reduced and a discrete additional protective circuit is no longer necessary. The expense of surface mounting or installing a discrete protective circuit is also eliminated in the fabrication/assembly. The robustness of the overall system is increased and design space and design size are reduced. In general, it can be said that the protective arrangement and the bridge circuit are advisedly provided on the same common substrate.

Thanks to the conversion resistance, on the one hand a current flow through the freewheeling path in normal operation should be avoided as much as possible, and on the other hand the fastest and most effective possible de-excitation and therefore conversion of the exciter current or the exciter current quantity into heat should be achieved. For this, it can be provided in particular that the conversion resistance has an ohmic resistance value of 100 milliohm to 5 Ohm and/or is configured as a thick film resistor. Thick film resistors, especially SMD thick film resistors, have also proven to be extremely useful for use as a discharge resistor and they are especially advantageous in the described application, since the substrate of the exciter circuit can also be used for the discharge resistor. Alternatively, of course, other customary wire-wound resistor elements and the like can also be used.

Advisedly, the controller can also be configured to trigger the bridge circuit in a regenerative mode when the rapid de-excitation signal is present. If the bridge circuit is configured as an asymmetrical full bridge, the controller for opening the corresponding bridge switches can be configured in addition to the semiconductor switch. In this way, portions of the exciter current power which still get through to the voltage supply terminals can also advisedly be dissipated.

The controller can be configured moreover to operate the semiconductor switch in the closed state in a normal operation, when no rapid de-excitation signal is present. This means that, in the normal operation, the exciter circuit behaves basically as if the protective arrangement were not present, since the semiconductor switch is designed for the minimal possible resistance.

Specifically, the rapid de-excitation signal can be an accident signal and/or a fault signal. An accident signal can be provided for example by accident sensors, such as crash sensors, or by a controller of a motor vehicle evaluating their sensor data, in which the externally excited synchronous machine is used as a traction machine. Fault signals describing, for example, a fault necessitating the disconnecting of the externally excited synchronous machine can be provided for example by corresponding diagnostic controllers or by a controller associated with the externally excited synchronous machine itself.

Besides the exciter circuit, the present disclosure also relates to a motor vehicle, comprising an externally excited synchronous machine, an exciter circuit according to the present disclosure associated with the externally excited synchronous machine, and a power electronics arrangement hooked up to a high-voltage network, especially an inverter associated with the synchronous machine. The exciter circuit here is connected to the exciter winding of the externally excited synchronous machine, which is arranged in the rotor, and can be likewise hooked up by way of the voltage supply terminals to the high-voltage network. In particular, the power electronics arrangement comprises at least one intermediate circuit capacitor at the inputs of the inverter, across which both the inverter and the exciter circuit can be connected to the high-voltage network. The inverter here is in particular a three-phase inverter, which can accordingly contain a B6 bridge circuit. The inverter is connected to the stator windings of the externally excited synchronous machine. All the remarks relating to the exciter circuit according to the disclosure can also be transferred accordingly to the motor vehicle according to the disclosure, with which the already mentioned benefits can therefore likewise be obtained.

The exciter circuit can be realized specifically as part of an exciter module, especially one having a housing. This simplifies the handling, enhances the safety, and enables in particular a construction comparable to power modules of the power electronics arrangement, for which a power module can be provided for each phase, for example.

In an especially advantageous embodiment of the present disclosure, the motor vehicle can comprise moreover a cooling device having a heat sink, to which the exciter circuit with the protective arrangement, especially in the exciter module, is thermally bound for the heat dissipation. With particular advantage, at least one portion of the power electronics arrangement can also be thermally bound to such a heat sink for heat dissipation, especially as a power module comprising at least one housing. Thanks to the connection of the exciter circuit, especially in the form of the exciter module, directly to the heat sink, not only can the power dissipation occurring in the bridge circuit be given off directly to the heat sink and thus to the cooling device, but so too can the heat produced by the conversion resistance during the rapid de-excitation. Even so, it should be noted that a portion of the power dissipation which occurs is also diverted directly to the heat sink by the additional semiconductor switch of the protective arrangement, since the protective arrangement is integrated in the exciter circuit, especially the exciter module, and thus is thermally connected as directly as possible to the heat sink. Thanks to the connecting of the protective arrangement to the preferably active cooling of the cooling device, the large amount of energy of the rotor, specifically that of the exciter current in the exciter winding, can be managed, which is especially easy to do thanks to the integration in the exciter circuit, especially the exciter module, since it has been proposed to connect this to the heat sink, which also actively cools the inverter. In other words, an extremely robust overall system is obtained, in which the rapid de-excitation function is taken over by the exciter circuit and the protective arrangement with the exciter circuit, especially one being an exciter module and/or arranged on a common substrate, is connected to the heat sink.

As was already mentioned, the motor vehicle is in particular a hybrid motor vehicle, but preferably it is an electric motor vehicle. In this case, the externally excited synchronous machine is a traction machine of the motor vehicle, and hence forms part of the drive train of the motor vehicle. Especially in the case of electric motor vehicles, but also in the case of hybrid motor vehicles, stiff requirements are placed on the functional safety, which can be especially easily fulfilled by the procedure according to the disclosure.

Finally, the disclosure also relates to a method for the de-excitation of an exciter winding of an externally excited synchronous machine having an exciter circuit according to the present disclosure or in a motor vehicle according to the present disclosure, wherein the semiconductor switch is opened when the rapid de-excitation signal is present. All remarks on the exciter circuit according to the disclosure and the motor vehicle according to the disclosure can also be applied to the method according to the disclosure.

The controller can be realized in particular as part of a controller of the motor vehicle, for example, a drive controller or also a controller provided especially for the power electronics of the externally excited synchronous machine.

BRIEF DESCRIPTION OF THE SEVERAL VIEWS OF THE DRAWINGS

Further benefits and details of the present disclosure will emerge from the following described exemplary embodiments as well as the drawings.

DETAILED DESCRIPTION

Figure 1:
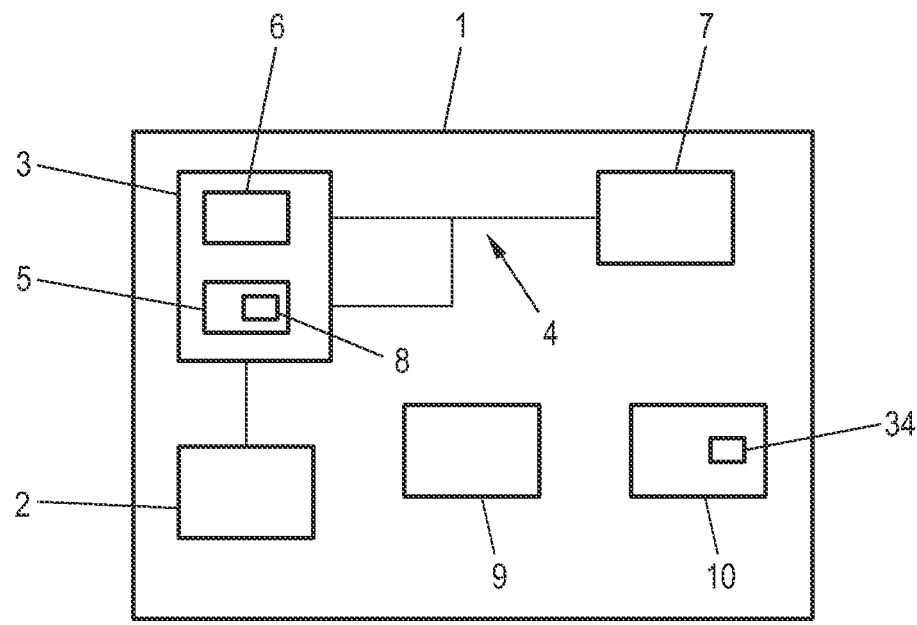
FIG. 1 shows a schematic sketch of a motor vehicle according to the disclosure.

FIG. 1 shows a schematic sketch of a motor vehicle 1 according to the disclosure, in the present case an electric motor vehicle. The electric motor vehicle comprises a traction machine in a drive train not shown more closely here, being configured as an externally excited synchronous machine 2. The externally excited synchronous machine 2 comprises a rotor not shown more closely in FIG. 1 with an exciter winding and a stator with stator windings, there being one stator winding for each of three phases.

The externally excited synchronous machine 2 is connected across a power electronics arrangement 3 to a high-voltage network 4 of the motor vehicle 1. For the connection of the exciter winding to the high-voltage network 4, the motor vehicle 1 furthermore comprises an exciter circuit 5, which can also be viewed as being part of the power electronics arrangement 3. The power electronics arrangement 3 comprises an inverter 6, by which the stator windings are connected to the high-voltage network 4. The high-voltage network 4 has a higher voltage than a low-voltage network of the motor vehicles 1, which is not shown here. The operating voltage of the high-voltage network 4 can lie for example in a range of more than 200 V, especially 350 to 1000 V, this being a DC voltage network. The high-voltage network 4 is energized by a high-voltage battery 7. In the high-voltage network 4, other high-voltage components or network components can also be provided and hooked up to it, such as a DC voltage converter provided between the low-voltage network and the high-voltage network, an on-board charger for the high-voltage battery 7, an electrical air conditioning compressor and/or an electrical heater.

The power electronics arrangement 3 can also comprise an intermediate circuit having at least one intermediate circuit capacitor, by which the exciter circuit 5 is also hooked up to the high-voltage network 4.

In the present case, a protective arrangement 8 is integrated in the exciter circuit 5, which provides a freewheeling path with a conversion resistance, by way of which the electric energy of an exciter current can be converted into thermal energy.

Moreover, in this context as well, the motor vehicle 1 comprises a cooling device 9, containing a cooling fluid, such as cooling water, which circulates in a cooling circuit and serves for the cooling of the inverter 6 as well as the exciter circuit 5 with the protective arrangement 8. In order to control the operation of these components, the motor vehicle furthermore comprises a control device 10, which can include one or more controllers.

Figure 2:
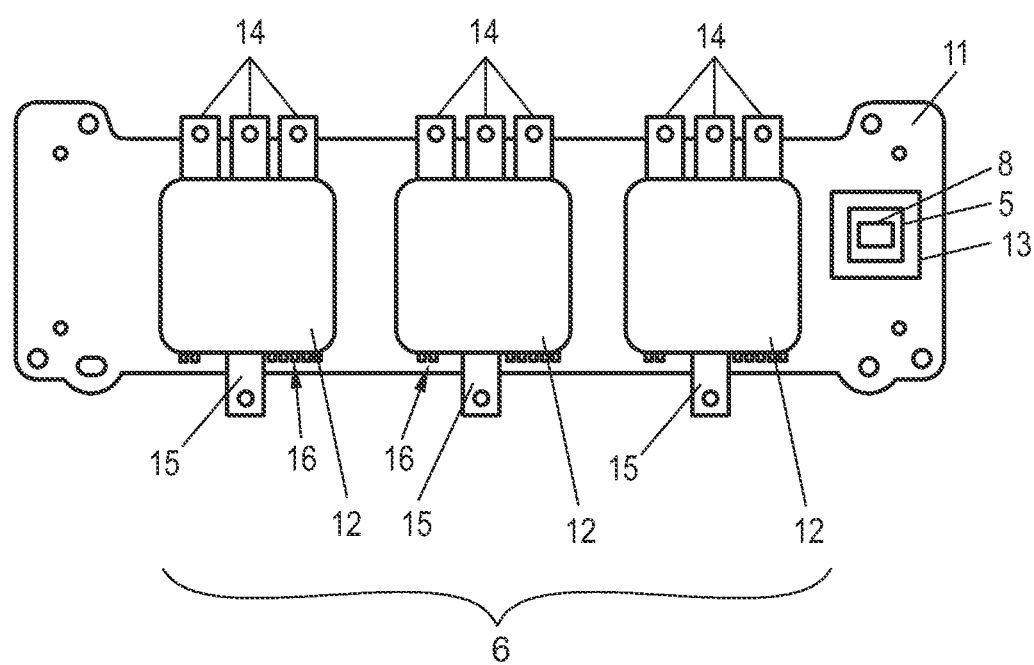
FIG. 2 shows a view of a heat sink with modules thermally attached to it.

FIG. 2 shows as an example a heat sink 11 of the cooling device 9, which in the present case comprises, though not otherwise shown, at least one duct and/or at least one cavity through which the cooling fluid can flow in the cooling circuit. Besides power modules 12 for each phase, together forming the inverter 6, there is also attached to the heat sink 11 and thermally connected to it for the cooling an exciter module 13, in which the exciter circuit 5 with the protective arrangement 8 is located in a housing. In this way, the heat sink 11 can also cool the components of the protective arrangement 8, in addition to the bridge switches of a bridge circuit of the exciter circuit 5, designed as semiconductor switches.

The power modules 12 can also have a housing enclosing the corresponding power electronics components, especially including semiconductor switches. In the present instance, the power terminals 14 of the power modules 12 at the high-voltage network 4 and the power terminals 15 for the stator windings of the individual phases and corresponding actuating terminals 16 are also shown. These are not indicated on the exciter module 13, for clarity of the drawing.

Figure 3:
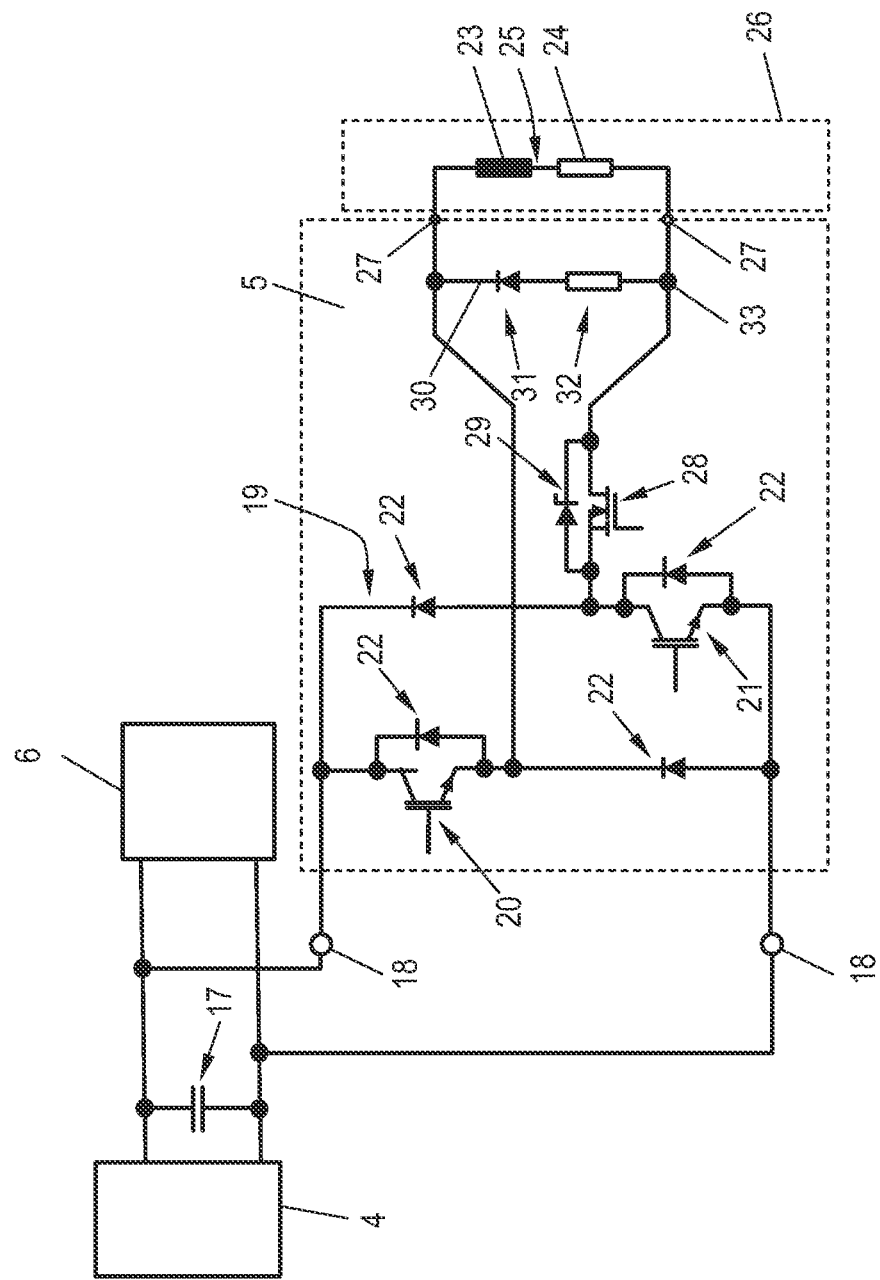
FIG. 3 shows a circuit diagram of an exemplary embodiment of an exciter circuit.

FIG. 3 shows a circuit diagram of an exciter circuit 5 as well as the surrounding components in an exemplary embodiment. The inverter 6, designed here as a B6 bridge circuit, is not shown more closely. Across an intermediate circuit with intermediate circuit capacitors 17, switched in parallel with both the inverter 6 and the exciter circuit 5, the inverter 6 and the exciter circuit 5 are hooked up to the high-voltage network 4.

For this, the exciter circuit 5 has voltage supply terminals 18, at which a bridge circuit 19, here an asymmetrical full bridge, is situated on a substrate. The bridge circuit 19, as is basically known, comprises two bridge switches 20, 21, which can be configured for example as IGBTs or MOSFETs. Furthermore, diodes 22 are provided, as is basically known.

The exciter circuit 5 moreover has exciter current terminals 27 for the connection to the exciter winding 25 in the rotor 26 of the externally excited synchronous machine 2, shown here as an equivalent circuit with the inductance 23 and the ohmic resistance 24. Now, between the exciter current terminals 27 and the bridge circuit 19, there is provided a protective arrangement 8, here likewise arranged on the same substrate, having a semiconductor switch 28 connected in series with the exciter winding 25, and switched in parallel with a Zener diode 29 in the blocking direction. Moreover, the protective arrangement 8 has a freewheeling path 30, comprising a diode 31 and a conversion resistance 32, here, a thick film resistor. The freewheeling path 30 is switched in parallel with the exciter winding 25, there being a connection point 33 between the semiconductor switch 28 and the exciter winding 25. The semiconductor switch 28 is arranged for example in the return path and in the present instance is realized as an N-channel MOSFET, but it can also be realized as an IGBT.

The semiconductor switch 28 can be actuated by a -controller 34 of the control device 10, cf. FIG. 1. In one or more embodiments, the controller 34 includes a processor and a memory storing instructions which, when executed by the processor, cause the processor to perform the functions of the controller 34 described herein. In a normal operation, when no rapid de-excitation signal is present, the semiconductor switch 28 is closed. Therefore, the customary operating states or operating modes, which can be achieved through the asymmetrical full bridge, can be used.

Figure 4:
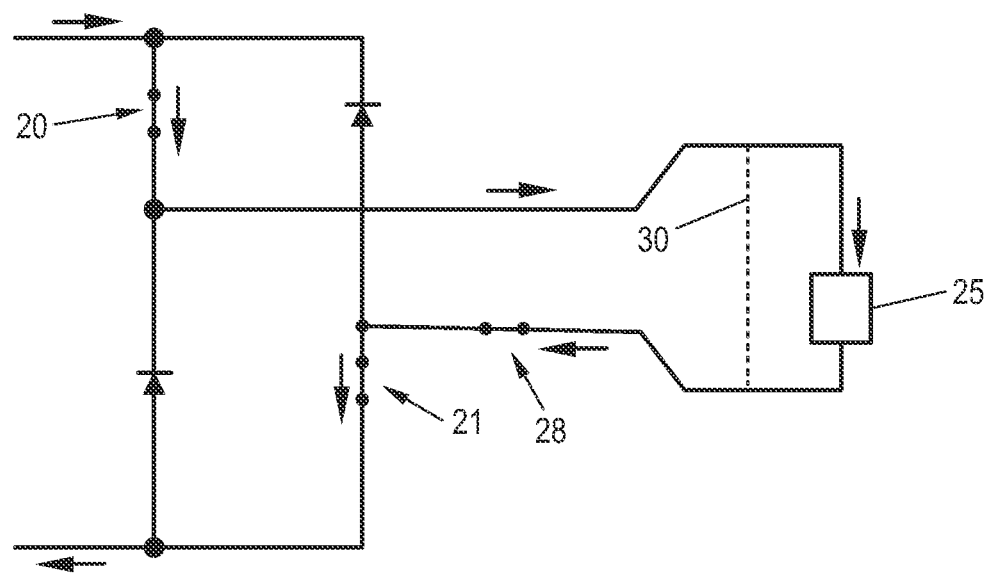
FIG. 4 shows schematically, the current flow in a first operating mode of normal operation.
Figure 5:
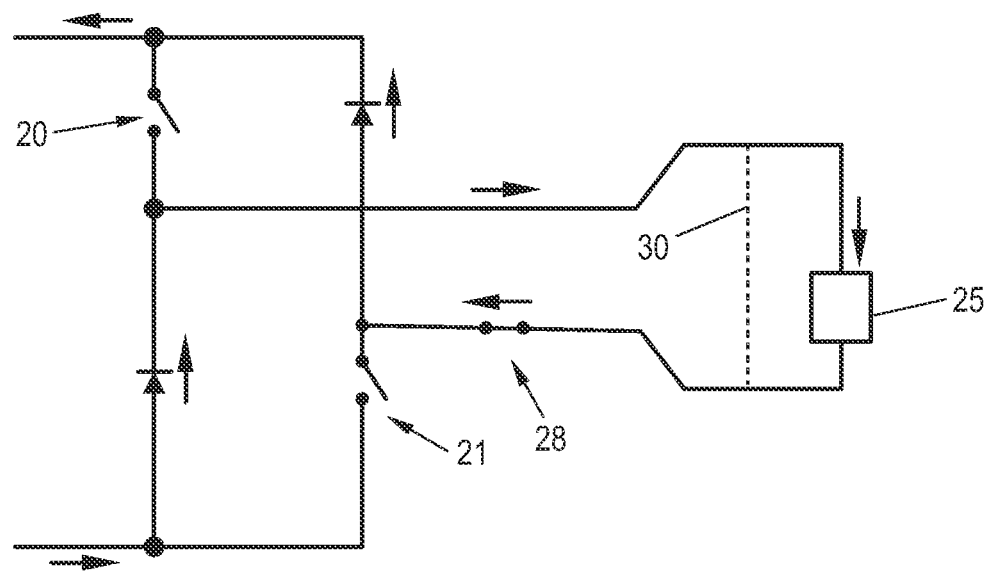
FIG. 5 shows schematically, the current flow in a second operating mode of normal operation.

For example, FIG. 4 and FIG. 5 show with the switches 20, 21 and 28 indicated here only in simplified manner the current flow for an operating mode to build up the rotor current (FIG. 4), in which both bridge switches 20, 21 are closed, and a regenerative mode (FIG. 5), in which the bridge switches 20, 21 are opened. The semiconductor switch 28 is closed.

Figure 6:
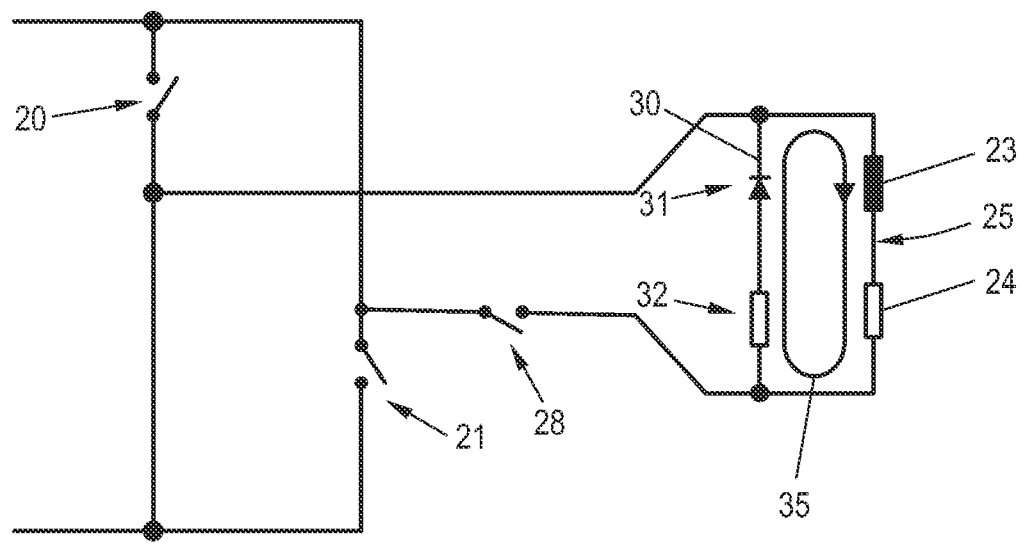
FIG. 6 shows schematically, the current flow in a rapid de-excitation operating mode.

In event of an accident and in event of a relevant fault, a rapid de-excitation signal can be provided to the controller 34 through other components of the motor vehicle 1, such as accident sensors, a diagnostic controller, and the like, as the accident signal or the fault signal. When the rapid de-excitation signal is present, the controller 34 trigger the semiconductor switch 28 and also in the present case the bridge switches 20, 21 to open. The emergency operating mode illustrated schematically in FIG. 6 then results, in which the current flow in the direction of the high-voltage network 4 is interrupted by opening the semiconductor switch 28. Since the inductance 23 strives to maintain the exciter current, this now flows through the conversion resistance 32 and the diode 31 of the freewheeling path 30, cf. the arrow 35. The electric energy of the exciter current is very quickly converted by the conversion resistance 32 into power dissipation, here, thermal energy, and taken to the heat sink 11. Thus, the rotor 26 is demagnetized. The large quantity of energy of the rotor 26 can be dissipated without problems in this way, since the exciter circuit 5 and thus the protective arrangement 8 are connected directly to the active cooling by way of the cooling device 9, also see the explanations regarding FIG. 2 for this.

German patent application no. 102022121516.4, filed Aug. 25, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An exciter circuit for an externally excited synchronous machine, comprising:
    two voltage supply terminals for a voltage supply;
    two exciter current terminals configured to be connected to an exciter winding of the externally excited synchronous machine;
    a bridge circuit coupled to the voltage supply terminals;
    a controller; and
    a protective arrangement at a side of the exciter circuit with the exciter current terminals, wherein the protective arrangement includes a semiconductor switch electrically connected in series with the exciter winding, and a freewheeling path electrically connected in parallel with the exciter winding,
    wherein the freewheeling path includes a connection point between one of the exciter current terminals and the semiconductor switch,
    wherein the freewheeling path includes;
        a freewheeling diode which, in operation, is blocking in an exciter current flow direction; and
        a conversion resistor electrically connected in series with the freewheeling diode,
    wherein the bridge circuit includes a bridge switch electrically connected in series with a bridge diode,
    wherein a first end of the semiconductor switch is electrically connected between the bridge switch and the bridge diode, and a second end of the semiconductor switch is electrically connected to the connection point of the freewheeling path, and
    wherein the controller, in operation, opens the semiconductor switch when a de-excitation signal is present.

2. The exciter circuit according to claim 1, wherein the bridge circuit is configured as an asymmetrical full bridge.

3. The exciter circuit according to claim 1, wherein the semiconductor switch is an Insulated-Gate Bipolar Transistor (IGBT) or a Metal-Oxide-Semiconductor Field-Effect Transistor (MOSFET).

4. The exciter circuit according to claim 3, wherein the semiconductor switch is an N-channel MOSFET.

5. The exciter circuit according to claim 1, wherein the controller, in operation, switches the semiconductor switch in parallel with a protective diode.

6. The exciter circuit according to claim 5, wherein the protective diode is a Zener diode.

7. The exciter circuit according to claim 1, wherein the semiconductor switch is in a return path of the exciter current.

8. The exciter circuit according to claim 1, wherein the conversion resistor has an ohmic resistance value of 100 milliohm to 5 Ohm or is configured as a thick film resistor.

9. The exciter circuit according to claim 1, wherein the controller, in operation, triggers the bridge circuit in a regenerative mode when the de-excitation signal is present.

10. The exciter circuit according to claim 1, wherein the controller, in operation, operates the semiconductor switch in a closed state when the de-excitation signal is not present.

11. The exciter circuit according to claim 1, wherein the de-excitation signal is an accident signal or a fault signal.

12. A motor vehicle, comprising:
    an externally excited synchronous machine;
    an exciter circuit associated with the externally excited synchronous machine, wherein the exciter circuit includes:
        two voltage supply terminals for a voltage supply;
        two exciter current terminals configured to be connected to an exciter winding of the externally excited synchronous machine;
        a bridge circuit coupled to the voltage supply terminals,
        a controller; and
        a protective arrangement at a side of the exciter circuit with the exciter current terminals, wherein the protective arrangement includes a semiconductor switch electrically connected in series with the exciter winding, and a freewheeling path electrically connected in parallel with the exciter winding
    wherein the freewheeling path includes a connection point between one of the exciter current terminals and the semiconductor switch,
    wherein the freewheeling path includes;
        a freewheeling diode which, in operation, is blocking in an exciter current flow direction; and
        a conversion resistor electrically connected in series with the freewheeling diode,
    wherein the bridge circuit includes a bridge switch electrically connected in series with a bridge diode,
    wherein a first end of the semiconductor switch is electrically connected between the bridge switch and the bridge diode, and a second end of the semiconductor switch is electrically connected to the connection point of the freewheeling path, and
    wherein the controller, in operation, opens the semiconductor switch when a de-excitation signal is present; and
    a power electronics arrangement coupled to a voltage network.

13. The motor vehicle according to claim 12, wherein the power electronics arrangement includes an inverter associated with the synchronous machine.

14. The motor vehicle according to claim 12, wherein the exciter circuit is part of an exciter module having a housing.

15. The motor vehicle according to claim 12, further comprising:
    a cooling device having a heat sink to which the exciter circuit with the protective arrangement is thermally bound.

16. The motor vehicle according to claim 15, wherein at least part of the power electronics arrangement is thermally bound to the heat sink.

17. The motor vehicle according to claim 16, wherein the power electronics arrangement is a power module having at least one housing.

18. The motor vehicle according to one of claim 12, wherein the synchronous machine is a traction machine of the motor vehicle, wherein the motor vehicle is an electric motor vehicle.

19. A method for de-excitation of an exciter winding of an externally excited synchronous machine, the method comprising:
  providing an exciter circuit, wherein the exciter circuit includes:
    two voltage supply terminals for a voltage supply;
    two exciter current terminals configured to be connected to an exciter winding of the externally excited synchronous machine;
    a bridge circuit coupled to the voltage supply terminals,
    a controller; and
    a protective arrangement at side of the exciter circuit with the exciter current terminals, wherein the protective arrangement includes a semiconductor switch electrically connected in series with the exciter winding and a freewheeling path running in parallel with the exciter winding, and having
  wherein the freewheeling path includes:
    a connection point between one of the exciter current terminals and the semiconductor switch,
  wherein the freewheeling path includes:
    a freewheeling diode which, in operation, is blocking in an exciter current flow direction; and
    a conversion resistor electrically connected in series with the freewheeling diode; and
  wherein the bridge circuit includes a bridge switch electrically connected in series with a bridge diode, and
  wherein a first end of the semiconductor switch is electrically connected between the bridge switch and the bridge diode, and a second end of the semiconductor switch is electrically connected to the connection point of the freewheeling path, and
opening, by the controller, the semiconductor switch when a de-excitation signal is present.

* * * * *